United States Patent
Bartsch

(10) Patent No.: US 11,919,629 B2
(45) Date of Patent: Mar. 5, 2024

(54) VERTICAL TAKEOFF AND LANDING AIRCRAFT CONFIGURATION

(71) Applicant: VerdeGo Aero, Inc., De Leon Springs, FL (US)

(72) Inventor: Eric Richard Bartsch, Wilmette, IL (US)

(73) Assignee: VERDEGO AERO, INC., Daytona Beach, FL (US)

(*) Notice: Subject to any disclaimer, the term of this patent is extended or adjusted under 35 U.S.C. 154(b) by 293 days.

(21) Appl. No.: 16/638,652

(22) PCT Filed: Aug. 17, 2018

(86) PCT No.: PCT/US2018/000296
§ 371 (c)(1),
(2) Date: Feb. 12, 2020

(87) PCT Pub. No.: WO2019/036011
PCT Pub. Date: Feb. 21, 2019

(65) Prior Publication Data
US 2021/0129980 A1    May 6, 2021

Related U.S. Application Data

(60) Provisional application No. 62/547,216, filed on Aug. 18, 2017.

(51) Int. Cl.
*B64C 29/00* (2006.01)
*B64C 39/08* (2006.01)
(Continued)

(52) U.S. Cl.
CPC .......... *B64C 29/0033* (2013.01); *B64C 39/08* (2013.01); *B64U 30/10* (2023.01); *B64U 30/20* (2023.01)

(58) Field of Classification Search
CPC . B64C 29/0033; B64C 29/0075; B64C 1/062; B64D 7/00; B64D 45/00
See application file for complete search history.

(56) References Cited

U.S. PATENT DOCUMENTS

| 3,089,666 A | * | 5/1963 | Quenzler | ............ B64C 29/0033 244/66 |
| 3,231,221 A | | 1/1966 | Platt | |

(Continued)

FOREIGN PATENT DOCUMENTS

| CN | 109720540 A | * | 5/2019 | ............. B64C 1/062 |
| WO | 2016028358 A2 | | 2/2016 | |

OTHER PUBLICATIONS

ISA/US, International Search Report and Written Opinion of the Int'l Searching Authority issued in PCT/US18/00296, dated Dec. 6, 2018, 10 pgs.

*Primary Examiner* — Tien Q Dinh
*Assistant Examiner* — William L Gmoser
(74) *Attorney, Agent, or Firm* — Greenberg Traurig, LLP

(57) ABSTRACT

A vertical takeoff and landing (VTOL) aircraft is configured with a front set of propellers mounted to a front wing and an aft set of propellers mounted to an aft wing wherein the propellers may be repositioned by rotating them around a front thrust vectoring axis and an aft thrust vectoring axis respectively. The positioning of the propellers with respect to the thrust vectoring axes and the positioning of the thrust vectoring axes with respect to the upper and lower limits of the passenger compartment ensure that, as the propellers are rotated from a vertical thrust position to a horizontal thrust position, the plane of rotation of the propellers never intersects with the portion of the passenger compartment where a failure of propeller components could result in debris penetrating the passenger compartment and causing injury.

26 Claims, 8 Drawing Sheets

(51) Int. Cl.
*B64U 30/10* (2023.01)
*B64U 30/20* (2023.01)

(56) References Cited

U.S. PATENT DOCUMENTS

| | | | |
|---|---|---|---|
| 3,666,209 | A | 5/1972 | Taylor |
| 4,071,207 | A | 1/1978 | Piasecki et al. |
| 5,419,514 | A * | 5/1995 | Ducan .................. B64C 29/0033 244/23 B |
| 6,655,631 | B2 | 12/2003 | Austen-Brown |
| 7,874,513 | B1 | 1/2011 | Smith |
| 8,616,492 | B2 | 12/2013 | Oliver |
| 10,589,838 | B1 * | 3/2020 | Suppes .................. B64D 35/04 |
| 10,807,707 | B1 * | 10/2020 | Ter Keurs ............... B64C 17/02 |
| 2005/0230519 | A1 | 10/2005 | Hurley |
| 2007/0158494 | A1 | 7/2007 | Burrage |
| 2009/0212166 | A1 * | 8/2009 | Garreau .............. B64C 29/0033 244/100 R |
| 2018/0002015 | A1 * | 1/2018 | McCullough ............ B64D 1/08 |
| 2019/0071174 | A1 * | 3/2019 | Burigo ................ B64C 29/0033 |

* cited by examiner

VERTICAL TAKEOFF AND LANDING AIRCRAFT CONFIGURATION

CROSS-REFERENCE TO RELATED PATENT APPLICATIONS

This application is a 371 National Stage application of International PCT Application No. PCT/US2018/000296, filed Aug. 17, 2018, which claims the benefit of U.S. Provisional Patent Application No. 62/547,216, filed Aug. 18, 2017, the entire contents of each of which are hereby incorporated by reference in their entirety.

FIELD OF THE INVENTION

This disclosure relates to a vertical takeoff and landing aircraft that is configured to takeoff and land vertically and cruise horizontally while supported by a wing.

BACKGROUND

Vertical takeoff and landing (VTOL) aircraft are often used for takeoff and landing from small areas without runways, while still having the cruise efficiency provided by a wing.

SUMMARY

In an embodiment, an aircraft is configured with two wings, one positioned forward of the center of gravity and one positioned aft of the center of gravity, with each wing having four propellers attached to it. The wings are mounted to the fuselage of the aircraft on axes of rotation such that the wing can be positioned horizontally, vertically, or in any position between horizontal and vertical. The propellers on the front wing are mounted in front of the front wing and the propellers on the aft wing are mounted on the back of the aft wing. In forward flight, the propellers on the front wing are pulling the aircraft and the propellers on the aft wing are pushing the aircraft. As the aircraft slows down for a vertical landing, the wings and attached propellers begin to rotate about their axes of rotation. The front wing rotates such that the rotational planes of the propellers attached to it shift upwards and aft. The aft wing rotates such that the rotational planes of the propellers that are attached to it shift downwards and forwards. The propellers attached to the front wing are mounted sufficiently forward of the axis of rotation of the forward wing, such that they move to a position above the top of the passenger compartment when rotated into position for vertical flight. The propellers attached to the aft wing are mounted sufficiently aft of the axis of rotation of the aft wing, such that they move to a position below the bottom of the passenger compartment when rotated into position for vertical flight. Therefore, the plane of rotation of the propellers never passes through the passenger compartment or the portion of the fuselage containing important systems. The length of the landing gear is such that the aft propellers have sufficient ground clearance during takeoff and landing.

In another embodiment, the wings of the aircraft are mounted in a fixed position and the motor nacelles attached to the propellers are rotated from horizontal to vertical with the axes of rotation of the nacelles and the positioning of the propellers configured such that the planes of rotation of the propellers never passes through the passenger compartment.

In yet another embodiment, a flexible driveshaft configuration is utilized such that the nacelles containing the motors remain in a fixed position and only the propeller is rotated between the horizontal and vertical thrust positions.

In various embodiments, the number of propellers at the front and back of the aircraft could be more than or less than four at each end.

In various embodiments, shielding on the lower rear portion of the fuselage is used to protect passengers and important aircraft systems from damage caused by a propeller failure, such that the planes of the propellers on the rear of the aircraft intersect with the lower shielded portion of the fuselage when they are rotated into the vertical thrust position, but none of the propeller rotational planes will intersect with the upper portion of the fuselage in any configuration of the aircraft.

DETAILED DESCRIPTION

Figure 1:
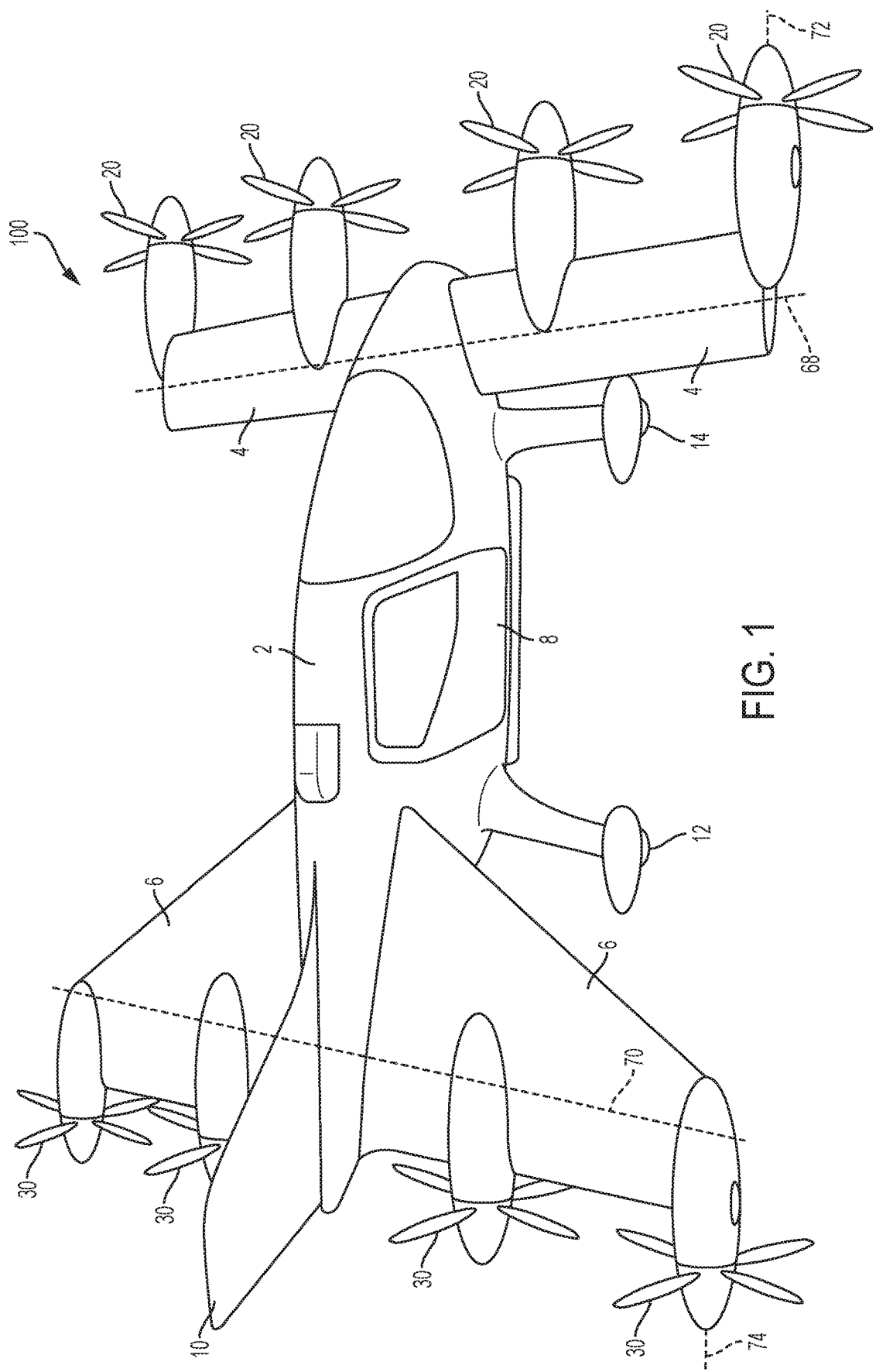
FIG. 1 is an isometric view of the vertical takeoff and landing airplane with the propellers in the horizontal thrust position in accordance with an illustrative embodiment.

Disclosed herein are various embodiments for a vertical takeoff and landing aircraft that is configured to takeoff and land vertically and cruise horizontally while supported by a wing. The configuration detailed in this disclosure permits the rotors to move from a vertical thrust configuration to a horizontal thrust configuration without having the plane of the rotors intersect with the passenger compartment at any point. This improves passenger safety should a mechanical failure occur with any of the rotor systems while they are operating.

Vertical takeoff and landing (VTOL) airplanes are desirable to enable takeoff and landing from small areas without runways. Additionally, VTOL airplanes may have wings that provide cruise efficiency. Transitioning from a vertical flight configuration to a horizontal flight configuration can involve rotating the axis of thrust around an axis perpendicular to the axis of thrust, which involves altering the plane of the rotors or propellers with respect to the fuselage of the airplane. For purposes of this disclosure, either rotors or propellers have the same issues with safety of the aircraft occupants should a mechanical failure occur, and therefore rotors or propellers will be treated interchangeably for the purpose of this disclosure. When a propeller fails, the forces on the rotating components typically cause them to depart from the propeller in a direction perpendicular to the rotational axis of the propeller, e.g., the plane of the propeller's rotation. There is a risk, in certain configurations of aircraft, that components departing from a failed propeller could cause injury to occupants or damage aircraft systems if they lie within the plane of rotation. In certain aircraft configurations, the planes of the propellers pass through the passenger compartment as the axis of thrust occurs rotates.

Some aircraft have propellers with rotational planes that intersect with a passenger compartment, creating these safety risks should a mechanical failure occur at the wrong time. Great risks are present when rapidly rotating propeller and engine components fail. The collision between pieces of failed rotating hardware on aircraft and important systems or passengers has led to multiple fatal accidents.

Advantageously, the aircraft configurations disclosed herein include propellers with planes of rotation that at no time intersect with a passenger compartment of the aircraft. Further advantages of the aircraft configuration disclosed herein include a propeller/rotor configuration that provides improved controllability and stability of the aircraft. A problem solved by the configuration disclosed herein is how to keep propeller/rotor planes from intersecting a passenger compartment while avoiding controllability and stability issues that may occur based on positioning propellers/rotors far away from a center of gravity of the aircraft. For example, certain systems, such as the one shown in US Pat. Appln. Pub. No. 2007/0158494 to Burrage, shows a system that shifts substantially with respect to the center of gravity of the aircraft as the propellers are moved from a point directly above the center of gravity of the aircraft to a point either in front of or behind the entire passenger compartment. The various configurations disclosed herein avoid such problems, allowing increased control and stability over conventional systems, such as that shown in Burrage.

FIGS. 1-4 illustrate a vertical takeoff and landing aircraft 100 in accordance with various embodiments. A fuselage 2 contains a passenger compartment 8 where the occupants of the aircraft are seated and fixed landing gear 12 and 14. The passenger compartment 8 has an upper limit of passenger compartment 60 defined as the upper limit of the portion of the fuselage 2 that is occupied by passengers. The passenger compartment 8 also has a lower limit of passenger compartment 62 defined as the lower limit of the portion of the fuselage 2 that is occupied by passengers.

A tilting front wing 4 is attached to the fuselage 2 and can pivot around a forward thrust vectoring axis 68. A tilting aft wing 6 is attached to the fuselage 2 and can pivot around an aft thrust vectoring axis 70. Front propellers 20 are mounted on the front side of the tilting front wing 4. Aft propellers 30 are mounted on the aft side of the tilting aft wing 6. A vertical stabilizer 10 is attached to the fuselage 2 to improve yaw stability. The front propellers 20 are configured to provide forward thrust by pulling the aircraft and aft propellers 30 are configured to provide forward thrust by pushing the aircraft.

Figure 2:
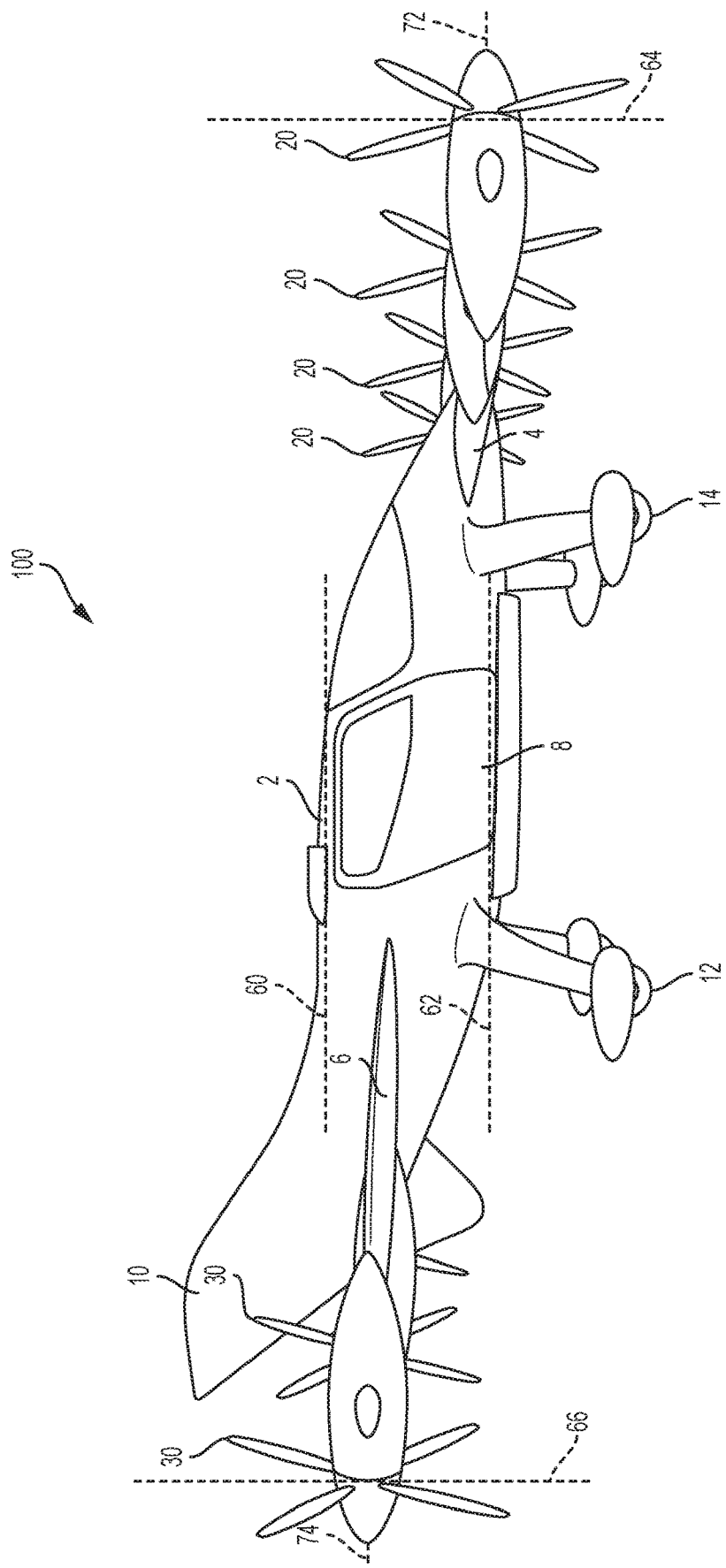
FIG. 2 is a side view of the vertical takeoff and landing airplane with the propellers in the horizontal thrust position in accordance with an illustrative embodiment.

In cruising flight, tilting front wing 4 and tilting aft wing 6 are configured in the horizontal position to enable the wings to provide lift. This configuration is seen in FIGS. 1 & 2. In this configuration, the thrust used from front propellers 20 and aft propellers 30 is minimized such that the vertical takeoff and landing aircraft 100 advantageously uses less energy to sustain flight. In cruising flight, front propellers 20 are positioned forward of passenger compartment 8 and aft propellers 30 are positioned aft of passenger compartment 8.

Figure 3:
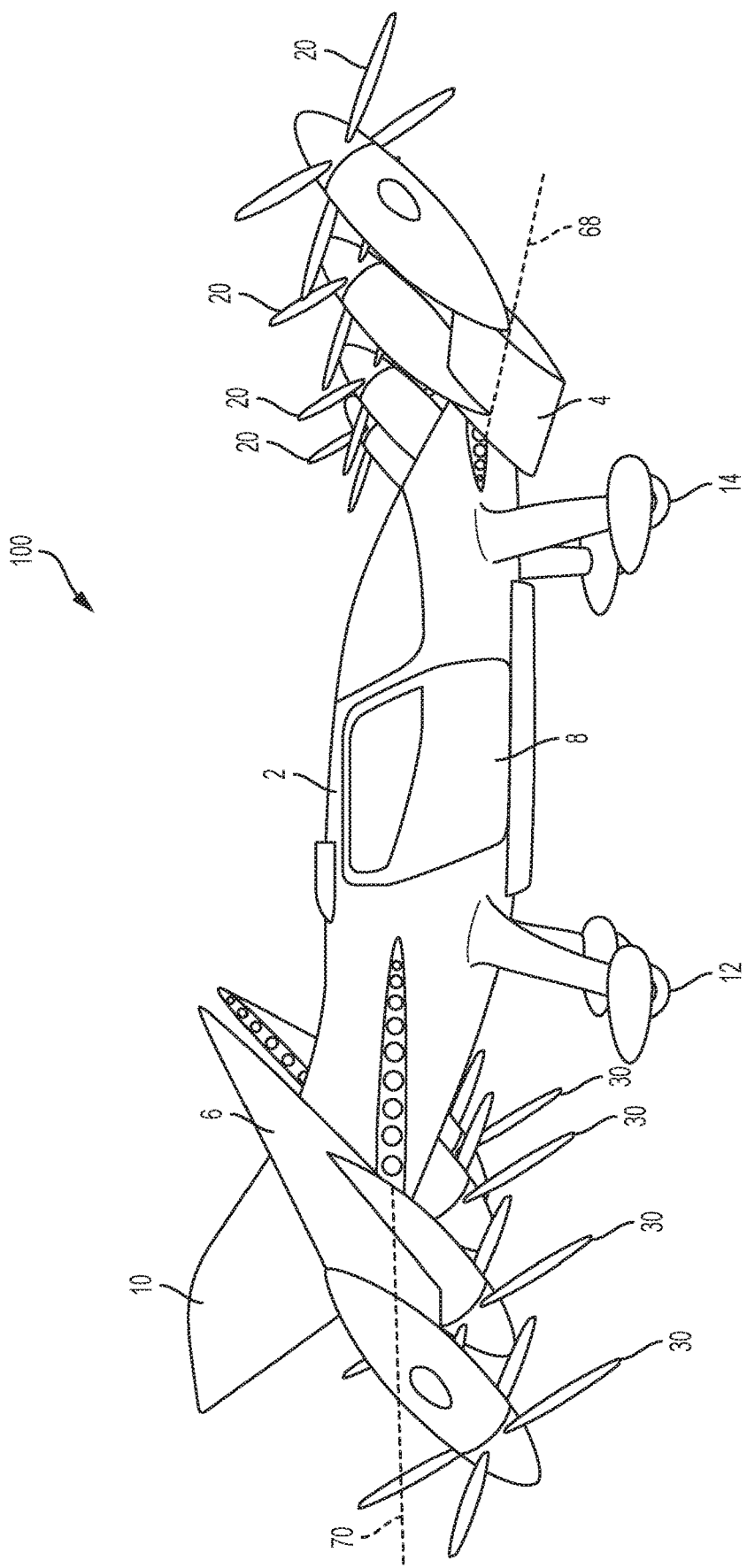
FIG. 3 is a side view of the vertical takeoff and landing airplane with the propellers midway between the horizontal and vertical thrust positions in accordance with an illustrative embodiment.

When the vertical takeoff and landing aircraft 100 approaches a landing location, the forward speed is reduced and the tilting front wing 4 rotates around the front thrust vectoring axis 68 substantially simultaneously with a tilting aft wing 6 rotating around an aft thrust vectoring axis 70, changing a forward axis of thrust 72 and an aft axis of thrust 74 to provide both a horizontal component of thrust and a vertical component of thrust. FIG. 3 shows the vertical takeoff and landing aircraft 100 with the tilting front wing 4 and tilting aft wing 6 midway between the horizontal and vertical configurations.

Figure 4:
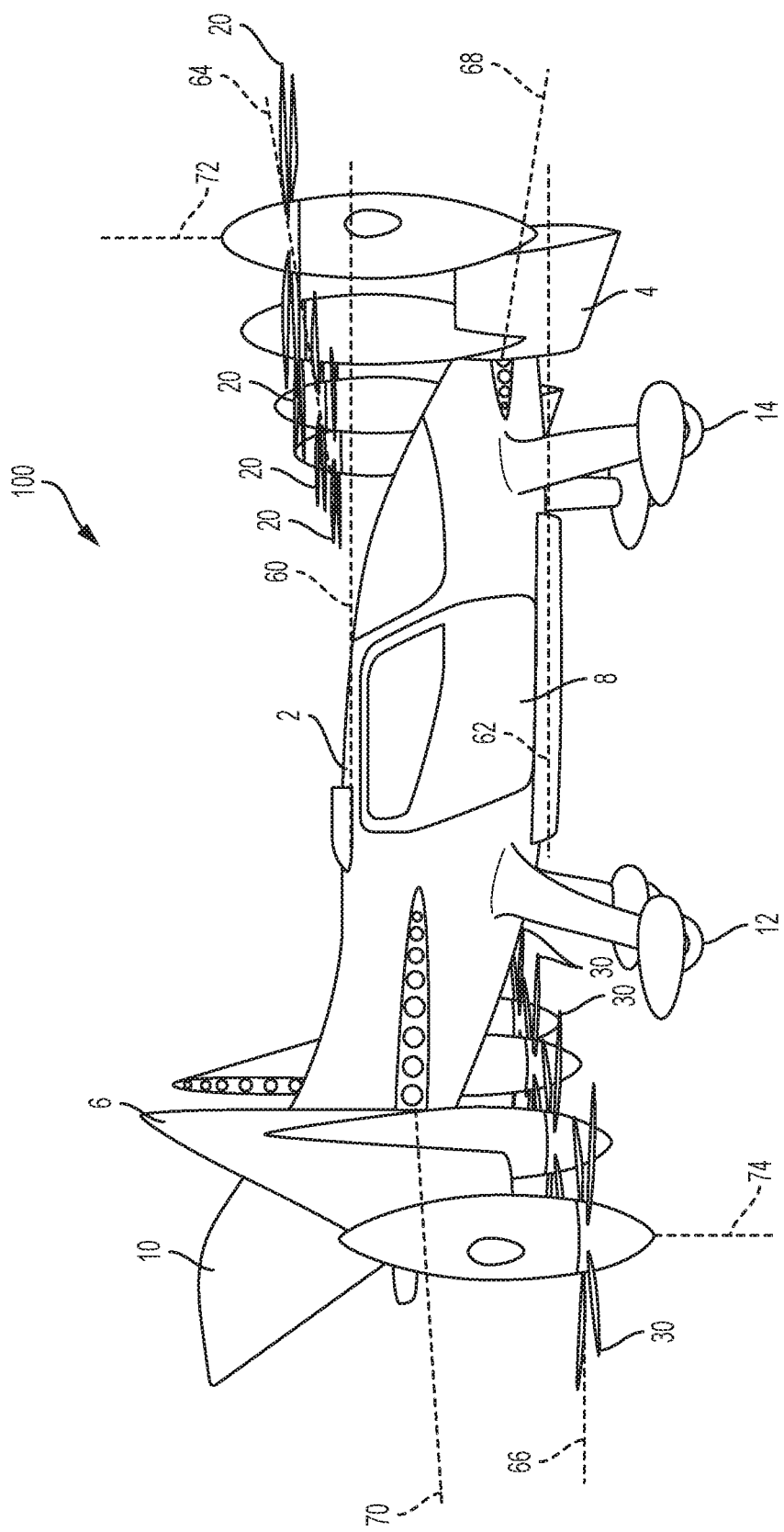
FIG. 4 is a side view of the vertical takeoff and landing airplane with the propellers in the vertical thrust position in accordance with an illustrative embodiment.

As the vertical takeoff and landing aircraft 100 slows down more, the tilting front wing 4 and tilting aft wing 6 transition into the vertical position seen in FIG. 4. In this configuration the aircraft is held in the air by the thrust generated by the front propellers 20 and aft propellers 30.

In order to increase safety, the front propellers 20, aft propellers 30, front thrust vectoring axis 68, aft thrust vectoring axis 70, upper limit of passenger compartment 60, and lower limit of passenger compartment 62 are configured such that the plane of front propeller 64 and the plane of aft propeller 66 never intersect with the passenger compartment 8 during the transition between the horizontal flight configuration seen in FIG. 2 and the vertical flight configuration seen in FIG. 4. The distance between the plane of front propeller 64 and front thrust vectoring axis 68 is greater than the distance between the front thrust vectoring axis 68 and the upper limit of passenger compartment 60. The distance between the plane of aft propeller 66 and the aft thrust vectoring axis 70 is greater than the distance between aft thrust vectoring axis 70 and the lower limit of passenger compartment 62. The relationship between these distances ensures that as the planes of front propeller 64 rotate around front thrust vectoring axis 68, the planes of front propeller 64 are always either in front of passenger compartment 8 or above passenger compartment 8. The relationship between these distances also ensures that as the planes of aft propeller 66 rotate around aft thrust vectoring axis 70, the planes of aft propeller 66 are always either behind the passenger compartment 8 or below it.

Figure 5:
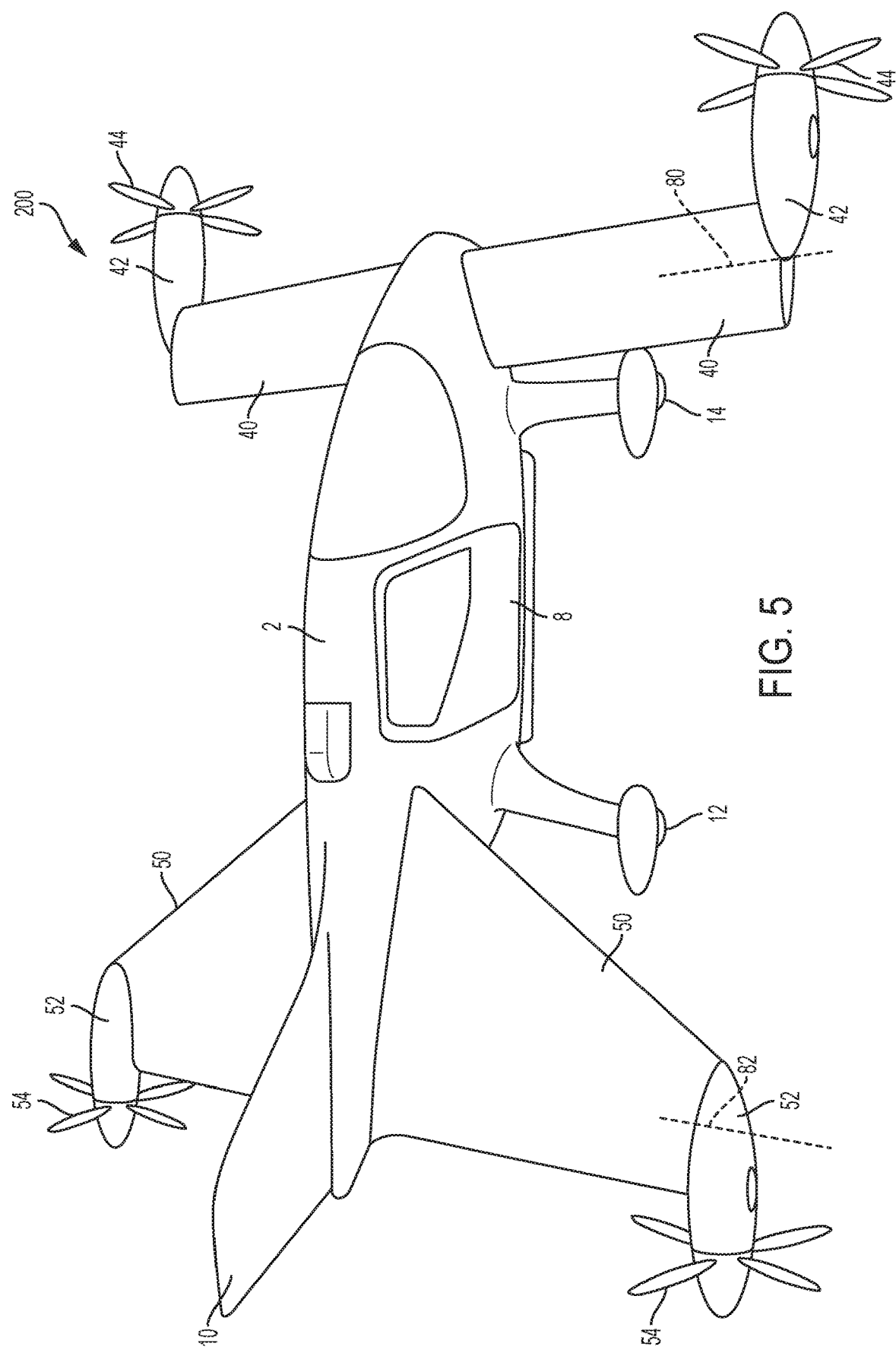
FIG. 5 is an isometric view of a vertical takeoff and landing airplane with four rotating motor nacelles and fixed wings with the propellers in the horizontal thrust position in accordance with an illustrative embodiment.
Figure 6:
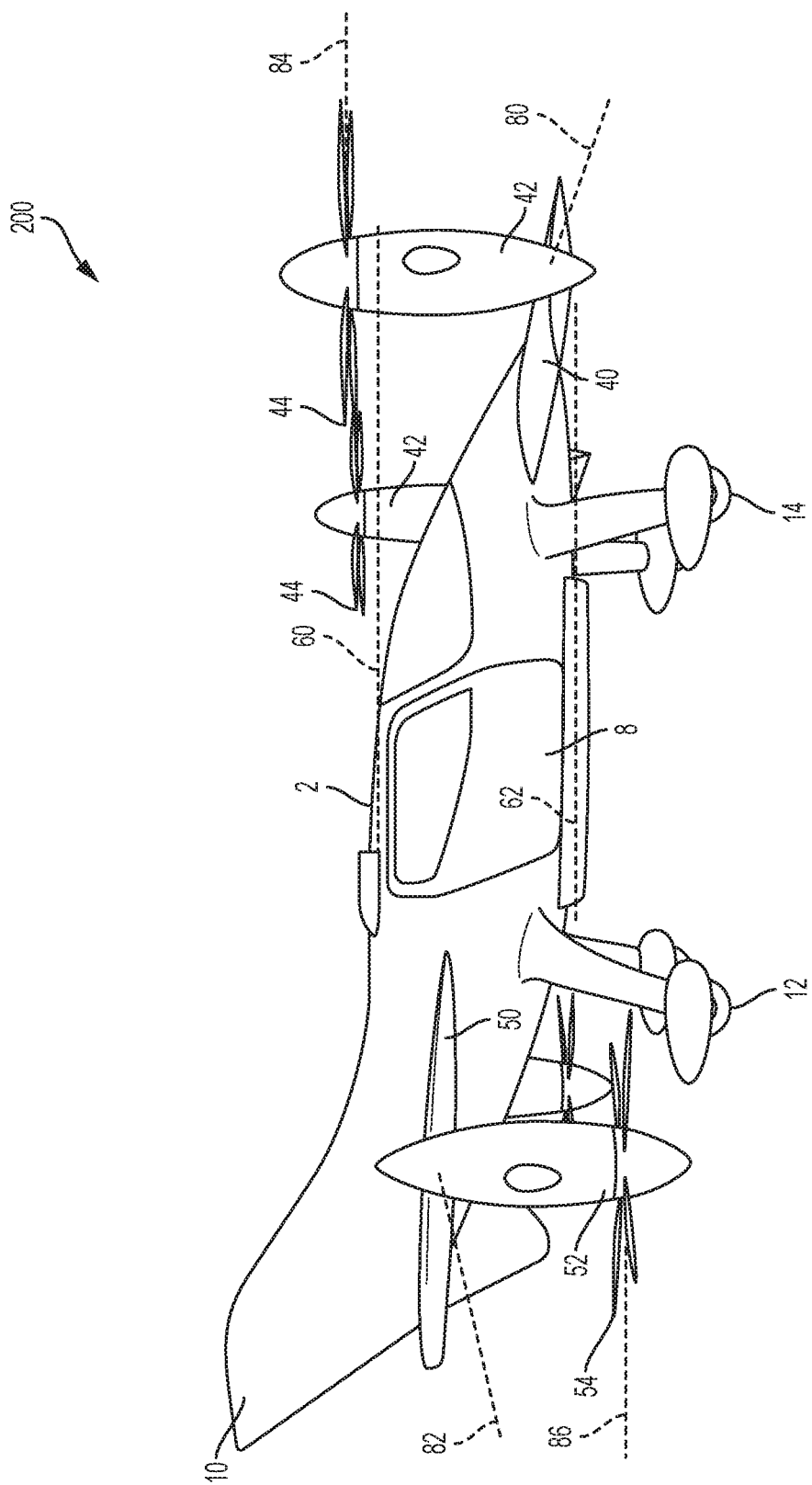
FIG. 6 is a side view of a vertical takeoff and landing airplane with four rotating motor nacelles and fixed wings, with the propellers in the vertical thrust position in accordance with an illustrative embodiment.
Figure 7:
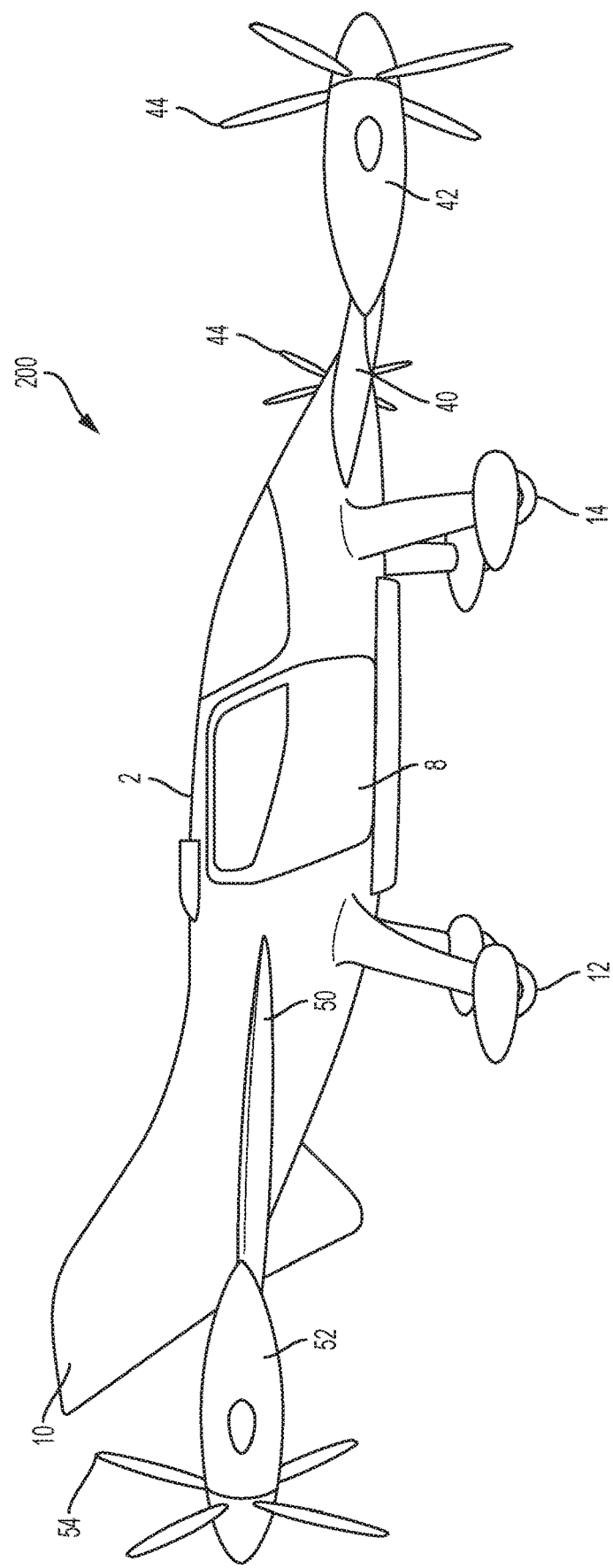
FIG. 7 is a side view of a vertical takeoff and landing airplane with four rotating motor nacelles and fixed wings, with the propellers in the horizontal thrust position in accordance with an illustrative embodiment.

FIGS. 5-7 illustrate an alternate embodiment for a vertical takeoff and landing aircraft 200. A fixed front wing 40 and a fixed aft wing 50 are rigidly attached to a fuselage 2. A tilting front motor nacelle 42 with a front propeller 44 is attached to a fixed front wing 40 such that it can rotate around a front thrust vectoring axis 80. A tilting aft motor nacelle 52 with an aft propeller 54 is attached to the fixed aft wing 50 such that it can rotate around an aft thrust vectoring axis 82.

The distance between a plane of front propeller 84 and the front thrust vectoring axis 80 is greater than the distance between the front thrust vectoring axis 80 and an upper limit of passenger compartment 60. The distance between a plane of aft propeller 86 and the aft thrust vectoring axis 82 is greater than the distance between an aft thrust vectoring axis and lower limit of passenger compartment 62.

Figure 8:
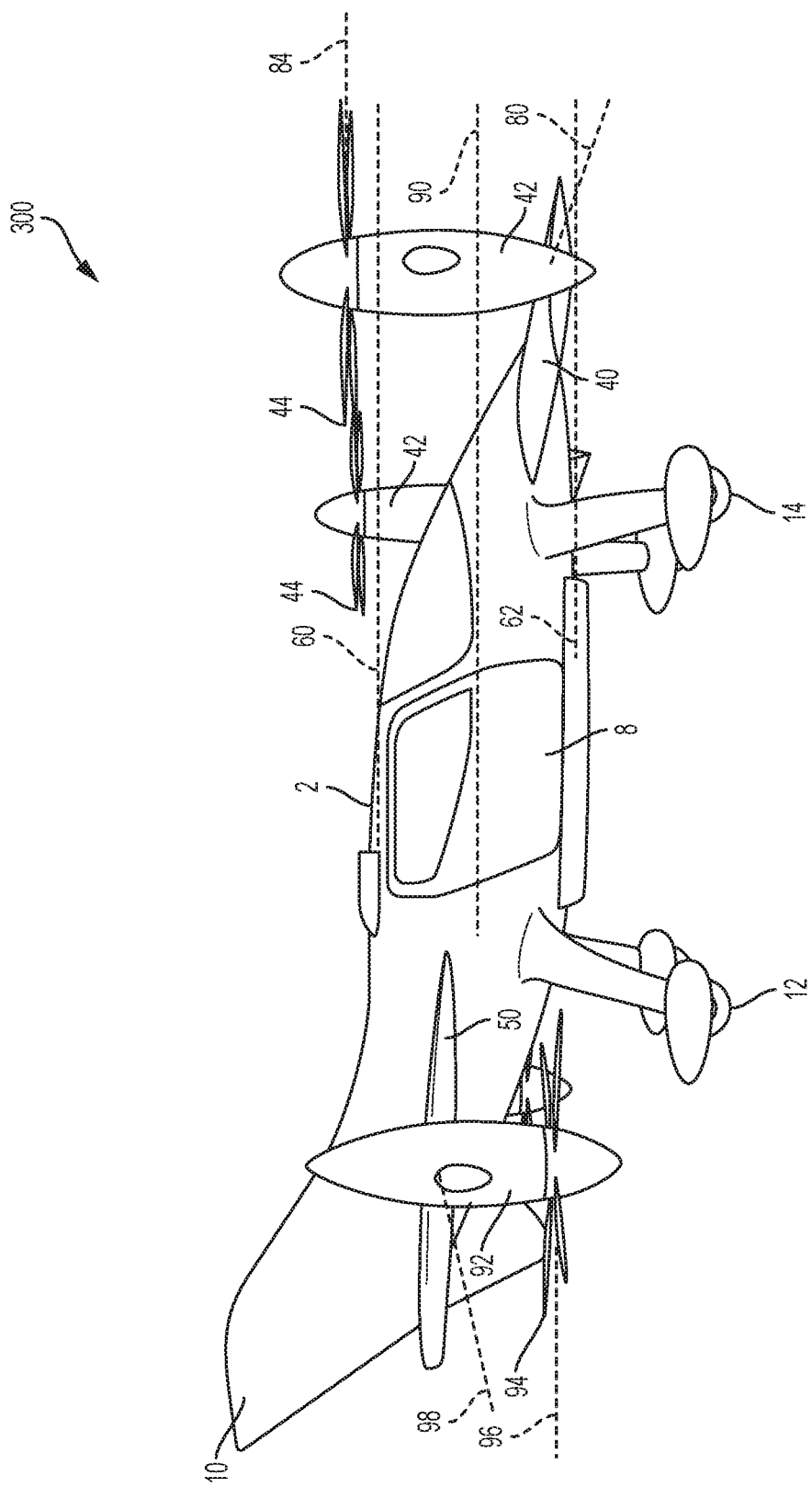
FIG. 8 is a side view of a vertical takeoff and landing airplane with a reinforced lower fuselage and propellers in the vertical thrust position in accordance with an illustrative embodiment.

FIG. 8 illustrates an additional configuration for a vertical takeoff and landing aircraft 300, in accordance with various embodiments. The portion of a fuselage 2 around a passenger compartment 8 that is above a lower limit of passenger compartment 62 and below an upper limit to a reinforced portion of fuselage 90 is reinforced to protect occupants from debris in the event of a mechanical failure of an aft propeller 94. The aft propeller 94 and a tilting aft motor nacelle 92 rotate around an aft thrust vectoring axis 98. The distance between a plane of aft propeller 96 and the aft thrust vectoring axis 98 is greater than the distance between the aft thrust vectoring axis 98 and the upper limit to the reinforced portion of fuselage 90. This configuration prevents the plane of aft propeller 96 from ever intersecting with the portion of the passenger compartment 8 that is above the upper limit to the reinforced fuselage 90 as the position of the aft propeller 94 is rotated around the aft thrust vectoring axis 98. This configuration also permits the windows in the upper non-reinforced fuselage above the upper limit to the reinforced portion of fuselage 90 to be lighter than they would have to be if they were required to prevent debris from a failed propeller from entering the passenger compartment 8.

What is claimed is:

1. A vertical takeoff and landing aircraft comprising:
   a fuselage;
   a passenger compartment within the fuselage;
   at least two front propellers located ahead of a center of gravity of the vertical takeoff and landing aircraft with at least one of the front propellers positioned on each side of the fuselage; and
   at least two aft propellers located behind the center of gravity with at least one of the aft propellers positioned on each side of the fuselage; wherein:
      a front axis of thrust of each of the at least two front propellers is substantially perpendicular to a front thrust vectoring axis, wherein the at least two front propellers are positioned ahead of the front thrust vectoring axis in a horizontal flight mode, and wherein the at least two front propellers and the front axis of thrust of each of the at least two front propellers are configured to rotate around the front thrust vectoring axis;
      an aft axis of thrust of each of the at least two aft propellers is substantially perpendicular to an aft thrust vectoring axis, wherein the at least two aft propellers are positioned aft of the aft thrust vectoring axis in the horizontal flight mode, and wherein the at least two aft propellers and the aft axis of thrust of each of the at least two aft propellers are configured to rotate around the aft thrust vectoring axis;
      front thrust offset distances are defined between rotational planes of the at least two front propellers and the front thrust vectoring axis, wherein the front thrust offset distances are greater than a first vertical distance from the front thrust vectoring axis to a top of the passenger compartment;
      aft thrust offset distances are defined between rotational planes of the at least two aft propellers and the aft thrust vectoring axis, wherein the aft thrust offset distances are greater than a second vertical distance from the aft thrust vectoring axis to a bottom of the passenger compartment;
      while the at least two front propellers rotate around the front thrust vectoring axis between positions associated with the horizontal flight mode and a vertical flight mode, the rotational planes of the at least two front propellers do not intersect with the passenger compartment; and
      while the at least two aft propellers rotate around the aft thrust vectoring axis between the positions associated with the horizontal flight mode and the vertical flight mode, the rotational planes of the at least two aft propellers do not intersect with the passenger compartment.

2. The vertical takeoff and landing aircraft of claim 1, wherein the at least two front propellers are mounted on a front wing and the at least two aft propellers are mounted on an aft wing.

3. The vertical takeoff and landing aircraft of claim 2, wherein the front wing rotates around the front thrust vectoring axis and the aft wing rotates around the aft thrust vectoring axis.

4. The vertical takeoff and landing aircraft of claim 3, wherein as the front wing rotates around the front thrust vectoring axis, the at least two front propellers also rotate around the front thrust vectoring axis.

5. The vertical takeoff and landing aircraft of claim 3, wherein as the aft wing rotates around the aft thrust vectoring axis, the at least two aft propellers also rotate around the aft thrust vectoring axis.

6. The vertical takeoff and landing aircraft of claim 2, wherein nacelles of the at least two front propellers rotate around the front thrust vectoring axis independently of the front wing.

7. The vertical takeoff and landing aircraft of claim 6, wherein the front wing is fixed with respect to the fuselage.

8. The vertical takeoff and landing aircraft of claim 2, wherein nacelles of the at least two aft propellers rotate around the aft thrust vectoring axis independently of the aft wing.

9. The vertical takeoff and landing aircraft of claim 8, wherein the aft wing is fixed with respect to the fuselage.

10. The vertical takeoff and landing aircraft of claim 2, wherein the front wing is attached to the fuselage at a point ahead of the center of gravity and the aft wing is attached to a point on the fuselage aft of the center of gravity.

11. The vertical takeoff and landing aircraft of claim 1, wherein the at least two front propellers and/or the at least two aft propellers are rotors or propellers.

12. The vertical takeoff and landing aircraft of claim 1, wherein the at least two front propellers comprises four front propellers and the at least two aft propellers comprises four aft propellers.

13. The vertical takeoff and landing aircraft of claim 1, wherein the front axis of thrust of each of the at least two front propellers is positioned forward of the passenger compartment while the at least two front propellers are configured in the vertical flight mode and the aft axis of thrust of each of the at least two aft propellers is positioned aft of the passenger compartment while the at least two aft propellers are configured in the vertical flight mode.

14. A vertical takeoff and landing aircraft comprising:
    a fuselage;
    a passenger compartment within the fuselage;
    at least two front propellers located ahead of a center of gravity of the vertical takeoff and landing aircraft with at least one of the front propellers positioned on each side of the fuselage; and
    at least two aft propellers located behind the center of gravity with at least one of the front propellers positioned on each side of the fuselage; wherein:
       a front axis of thrust of each of the at least two front propellers is substantially perpendicular to a front thrust vectoring axis, wherein the at least two front propellers are positioned ahead of the front thrust vectoring axis in a horizontal flight mode, and wherein the at least two front propellers and the front axis of thrust of each of the at least two front propellers are configured to be rotated around the front thrust vectoring axis;

an aft axis of thrust of each of the at least two aft propellers is substantially perpendicular to an aft thrust vectoring axis, wherein the at least two aft propellers are positioned aft of the aft thrust vectoring axis in the horizontal flight mode, and wherein the at least two aft propellers and the aft axis of thrust of each of the at least two aft propellers are configured to be rotated around the aft thrust vectoring axis;

an upper limit to a reinforced portion of the fuselage wherein a first portion of the fuselage below the upper limit is reinforced to prevent debris from a propeller failure from causing damage to occupants within the fuselage, and wherein a second portion of the fuselage above the upper limit is not reinforced to prevent debris from a propeller failure from causing damage to occupants within the fuselage;

front thrust offset distances are defined between rotational planes of the at least two front propellers and the front thrust vectoring axis, wherein the front thrust offset distances are greater than a first vertical distance from the front thrust vectoring axis to a top of the passenger compartment;

aft thrust offset distances are defined between rotational planes of the at least two aft propellers and the aft thrust vectoring axis, wherein the aft thrust offset distances are greater than a second vertical distance from the aft thrust vectoring axis to the upper limit of the reinforced portion of the fuselage;

while the at least two front propellers rotate around the front thrust vectoring axis between positions associated with the horizontal flight mode and a vertical flight mode, the rotational planes of the at least two front propellers do not intersect with the second portion of the fuselage that is not reinforced; and while the at least two aft propellers rotate around the aft thrust vectoring axis between the positions associated with the horizontal flight mode and the vertical flight mode, the rotational planes of the at least two aft propellers do not intersect with the second portion of the fuselage that is not reinforced.

15. The vertical takeoff and landing aircraft of claim 14, wherein the at least two front propellers and/or the at least two aft propellers are rotors or propellers.

16. The vertical takeoff and landing aircraft of claim 14, wherein the front axis of thrust of each of the at least two front propellers is positioned forward of the passenger compartment while the at least two front propellers are configured in the vertical flight mode and the aft axis of thrust of each of the at least two aft propellers is positioned aft of the passenger compartment while the at least two aft propellers are configured in the vertical flight mode.

17. The vertical takeoff and landing aircraft of claim 14, wherein the at least two front propellers are mounted on a front wing and the at least two aft propellers are mounted on an aft wing.

18. The vertical takeoff and landing aircraft of claim 17, wherein the front wing rotates around the front thrust vectoring axis and the aft wing rotates around the aft thrust vectoring axis.

19. The vertical takeoff and landing aircraft of claim 17, wherein nacelles of the at least two front propellers rotate around the front thrust vectoring axis independently of the front wing and nacelles of the at least two aft propellers rotate around the aft thrust vectoring axis independently of the aft wing.

20. A vertical takeoff and landing aircraft comprising:
a fuselage;
a passenger compartment within the fuselage;
a front propeller located ahead of a center of gravity of the vertical takeoff and landing aircraft; and
an aft propeller located behind the center of gravity;
wherein:
the front propeller is configured to rotate around a front thrust vectoring axis;
the aft propeller is configured to rotate around an aft thrust vectoring axis;
a front thrust offset distance is defined between a rotational plane of the front propeller and the front thrust vectoring axis, wherein the front thrust offset distance is greater than a first vertical distance from the front thrust vectoring axis to a top of the passenger compartment;
an aft thrust offset distance is defined between a rotational plane of the aft propeller and the aft thrust vectoring axis, wherein the aft thrust offset distance is greater than a second vertical distance from the aft thrust vectoring axis to a bottom of the passenger compartment
while the front propeller rotates around the front thrust vectoring axis between positions associated with a horizontal flight mode and a vertical flight mode, the rotational plane of the front propeller does not intersect with the passenger compartment; and
while the aft propeller rotates around the aft thrust vectoring axis between the positions associated with the horizontal flight mode and the vertical flight mode, the rotational plane of the aft propeller does not intersect with the passenger compartment.

21. The vertical takeoff and landing aircraft of claim 20, wherein while the aft propeller is configured in the horizontal flight mode, the rotational plane of the aft propeller does not intersect with the passenger compartment.

22. The vertical takeoff and landing aircraft of claim 21, wherein the aft propeller is configured to rotate around the aft thrust vectoring axis between the positions associated with the horizontal flight mode and the vertical flight mode, and further wherein at each of the positions associated with the horizontal flight mode, the vertical flight mode, and at any point while rotating therebetween, the rotational plane of the aft propeller does not intersect with the passenger compartment.

23. The vertical takeoff and landing aircraft of claim 20, wherein the front propeller is configured to rotate around the front thrust vectoring axis between the positions associated with the horizontal flight mode and the vertical flight mode, and further wherein at each of the positions associated with the horizontal flight mode, the vertical flight mode, and at any point while rotating therebetween, the rotational plane of the front propeller does not intersect with the passenger compartment.

24. The vertical takeoff and landing aircraft of claim 1, wherein the at least two front propellers remain ahead of the center of gravity while the at least two front propellers are configured in the horizontal flight mode and while the at least two front propellers are configured in the vertical flight mode.

25. The vertical takeoff and landing aircraft of claim 14, wherein the at least two front propellers remain ahead of the center of gravity while the at least two front propellers are configured in the horizontal flight mode and while the at least two front propellers are configured in the vertical flight mode.

26. The vertical takeoff and landing aircraft of claim 20, wherein the front propeller remains ahead of the center of gravity while the front propeller is configured in the horizontal flight mode and while the front propeller is configured in the vertical flight mode.

* * * * *